United States Patent Office 3,489,224
Patented Jan. 13, 1970

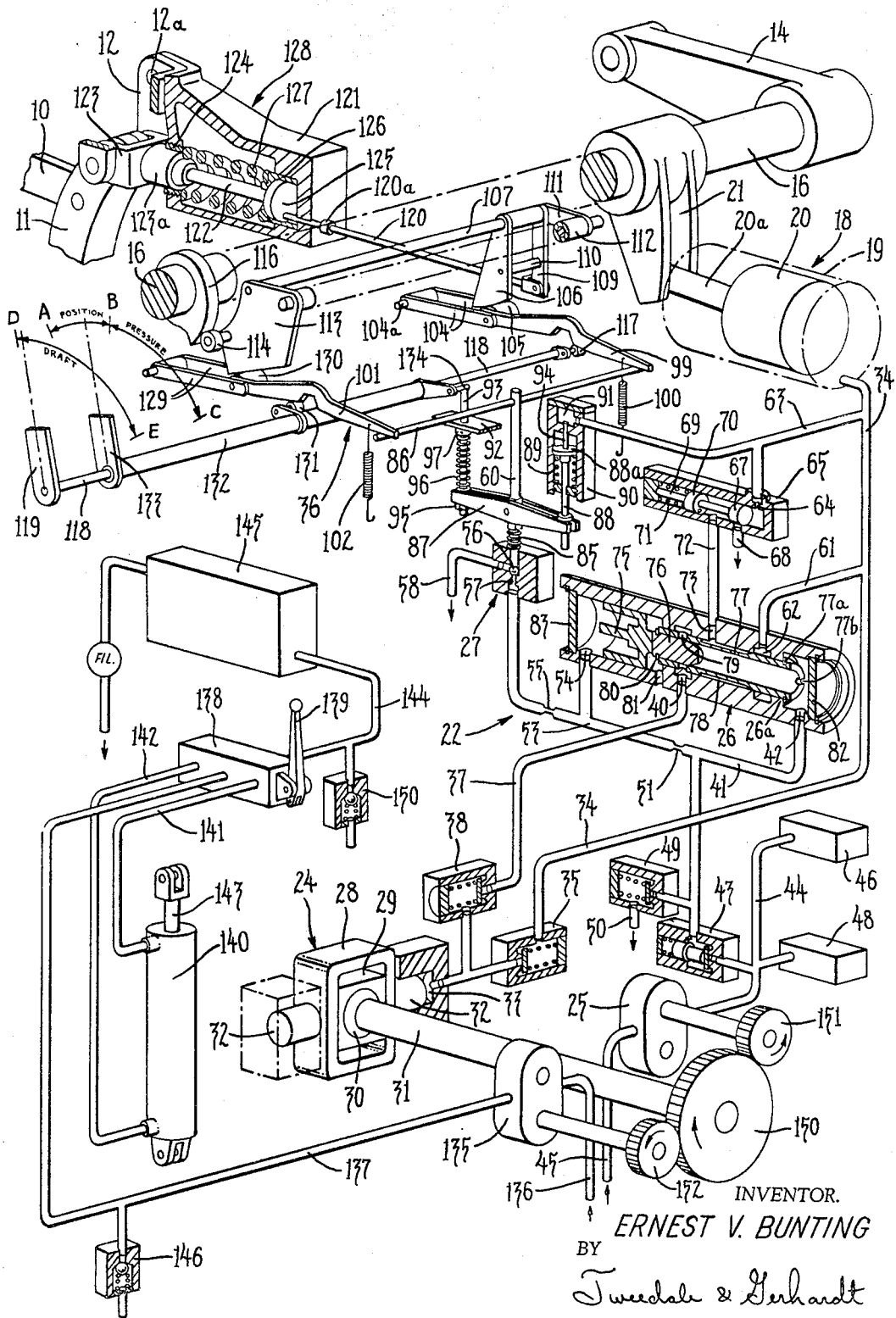

3,489,224
TRACTOR HYDRAULIC CONTROL SYSTEM
Ernest V. Bunting, Detroit, Mich., assignor to Massey-Ferguson Inc., Detroit, Mich.
Filed Nov. 1, 1966, Ser. No. 591,333
Int. Cl. A01b *63/12;* F16k *31/12, 31/36*
U.S. Cl. 172—9
9 Claims

ABSTRACT OF THE DISCLOSURE

A tractor having a three-point hitch which is elevated by a hydraulic actuator is provided with a hydraulic control arrangement that provides for draft, position and pressure control. The actuator is provided with hydraulic fluid through a primary circuit by a constantly running pump. The pump is supplied with fluid from a secondary circuit which receives fluid by a low pressure pump from the reservoir. Interposed in the secondary circuit is a relay which controls the supply of fluid to the pump and the exhaust of fluid from the actuator. The relay includes a valve mechanism which is operated by a servo member that is controlled by the secondary circuit pressure. A multi-lever linkage is manually set and is automatically operated by the condition of the tractor hitch to operate a pilot valve which controls the secondary circuit pressure. Thus any deviation from a preselected condition of the tractor hitch regulates the secondary circuit pressure to shift the relay valve and control the supply of fluid to the high pressure pump for delivery to the actuator and control exhaust of fluid from the actuator to correct the deviations. A more precise control is thus obtained by utilizing a low pressure secondary circuit rather than the high pressure primary circuit.

---

This invention relates generally to agricultural tractors, and is particularly concerned with tractors having hydraulic hitch linkage control systems of the type known generally as the "Ferguson System."

Basically, as refined and developed through the years, such tractors are provided with a three-point hitch linkage having a hydraulic actuator for raising and lowering the hitch in accordance with changes in a controlled hitch linkage condition. This basic system has been developed to provide for three types of hitch linkage control, namely, draft, position and pressure control.

Under draft control, a valve controlling flow to and from the hydraulic actuator is actuated in accordance with changes in the forces imposed on the hitch by the implement carried by the hitch. When the implement forces depart from a preselected value in one direction, fluid is admitted to the actuator to cause the hitch to be raised, and when the forces change in the opposite direction from the preselected value, fluid is discharged or drained from the actuator to lower the hitch linkage. An increase in the draft force acting on the implement tends to cause the valve to be actuated in a direction to admit fluid to the actuator and raise the hitch linkage, and conversely, a decrease in the draft force tends to actuate the valve in a direction to cause fluid to drain from the actuator and thereby lower the hitch linkage to increase the working depth of the implement. Thus, the working depth of the implement is controlled by maintaining a constant, preselected force on the hitch linkage. If the forces imposed on the hitch linkage by the implement deviate from the preselected value, the deviation is corrected by increasing or decreasing the working depth of the implement, and increases and decreases in the draft force tend to actuate the valve to respectively decrease and increase the working depth of the implement. An example of a draft control system is disclosed in Ferguson U.S. Patent 2,118,180, dated May 24, 1938.

With position control, an implement or load on the tractor hitch linkage is raised or lowered in accordance with the movement of a manual position control handle or similar device irrespective of changes in the magnitude of the load on the hitch. The tractor hitch, and the piston of the hydraulic actuator, have a position corresponding to every position of the position control lever within the range of movement of the latter. One example of a control system having position control is disclosed in Bunting U.S. Patent 2,996,124, dated Aug. 15, 1961.

A pressure control system provides, among other things, for the controlled transfer of weight to the tractor from an implement or trailer. The transferred weight is controlled by maintaining a constant, preselected pressure in the hydraulic actuator. When the pressure falls below the preselected value, fluid is admitted to the hydraulic actuator to increase the lifting force of the hitch linkage on the trailed implement to correct the pressure deviation. Conversely, when the load on the hitch increases, or changes such as to cause the hydraulic pressure to increase over the preselected value, fluid is drained from the actuator to correspondingly decrease the lifting force. An example of a pressure control system is disclosed in Bunting U.S. Patent 2,627,796 of Feb. 10, 1953.

Bunting U.S. Patent 3,241,621, of Mar. 22, 1966, discloses a system having draft, position and pressure control.

In my copending application entitled, "Hitch Linkage Control System," Ser. No. 591,334, filed concurrently herewith, the entire disclosure of which is incorporated herein by reference, the hydraulic actuator is connected with a primary hydraulic circuit which communicates with the output of a continuously driven pump. The pump intake communicates with a reservoir of hydraulic fluid through a pressure responsive valve movable between open and closed positions to respectively connect and disconnect the pump intake to and from the reservoir in response to pressure variations in a secondary hydraulic circuit. When the pressure in the secondary circuit decreases, the pressure responsive valve opens to connect the pump intake with the reservoir, and additional hydraulic fluid is delivered by the pump through the primary circuit to the actuator to raise the hitch linkage. When the pressure increases in the secondary circuit, the pressure responsive valve moves toward its closed position to decrease and substantially shut off the supply of hydraulic fluid to the pump intake.

For draft and position control, the secondary circuit pressure is determined by a main control valve movable in response to changes in a controlled hitch linkage condition to control communication between the primary and secondary circuits. When the hitch condition calls for more fluid at the actuator to raise the hitch, the main control valve shuts off communication between the primary and secondary circuits causing the pressure to fall in the secondary circuit, and the pressure responsive intake valve opens permitting the pump to deliver additional fluid to the actuator. Conversely, the main control valve opens in response to a hitch lowering signal to connect the primary circuit with the secondary circuit, and fluid drains from the actuator past the main control valve into the secondary circuit, thereby increasing the secondary circuit pressure and causing the pressure responsive pump intake valve to close.

For pressure control operation, the main control valve remains closed, and the secondary circuit pressure is controlled by a pressure control valve responsive to the primary circuit pressure to connect or disconnect the primary and secondary circuits to thereby control the pressure responsive intake valve.

In accordance with the present invention, a continuously driven high pressure pump has its output connected with a primary circuit for delivering hydraulic fluid through the primary circuit to the actuator. The intake of the main pump is connected with a relay mechanism which controls communication between the pump intake and a secondary circuit which receives hydraulic fluid from the output of a continuously driven charging pump having its intake in constant communication with a reservoir of hydraulic fluid. The secondary circuit pressure varies in accordance with the position of a pilot valve responsive to changes in the hitch linkage condition being controlled, whether the controlled condition is draft, position, or pressure.

Among the features of the present invention is the provision of a hydraulic control system in which the hydraulic actuator for raising and lowering the hitch linkage is controlled by varying the secondary or control pressure in accordance with changes in the hitch linkage condition being controlled. A unique hydraulic relay responds to the control pressure variations to correct the deviation by either causing hydraulic fluid to be delivered to the actuator, or by connecting the actuator with sump to drain fluid from the actuator. When the deviation has been corrected, the relay blocks the flow of fluid to and from the actuator.

The relay includes a pressure responsive servo element subjected to the control pressure, and valve elements actuated by the servo element between either a supply, neutral, or discharge position to respectively initiate delivery of hydraulic fluid to the actuator, block flow of fluid to and from the actuator, and initiate exhaust of fluid from the actuator. The control pressure is varied by movement of a pilot valve which responds to changes in the hitch linkage condition.

Another feature of the invention is the provision of a control linkage for actuating the pilot valve which is arranged such that when the hitch is operating under draft control, a position control signal is always present to prevent excessive changes in the hitch linkage position if called for by the draft control signal. However, the tractor can be placed in position control wherein the position of the hitch and implement or load carried thereby is determined solely by the position of a control handle irrespective of any draft force or other type of forces acting on the hitch.

Another feature of the invention lies in the provision of two hydraulic control circuits, one of which may be referred to as the primary, or controlled circuit, and the other of which may be refered to as the secondary, or controlling circuit. The hydraulic actuator for the hitch linkage is connected in the primary circuit, and the pilot valve and relay for controlling the actuation are connected in the secondary circuit. The pressure in the primary circuit increases and decreases in accordance with increases and decreases in the load imposed upon the hitch linkage by the implement connected therewith. The pressure in the secondary circuit is determined by the pilot valve. The primary circuit receives fluid from a main, high pressure pump continuously driven by the tractor engine. A low pressure, charging pump supplies pressure for the secondary circuit and is connected with the intake of the high pressure pump through the control relay. When the pilot valve responds to a change in the hitch condition to call for more fluid at the hydraulic actuator, the relay connects the output of the charging pump with the intake of the main pump to initiate delivery of fluid to the actuator through the primary circuit. When the pilot valve moves in a direction to call for lowering the hitch, the relay disconnects the main pump intake from the charging pump output and connects the cylinder with sump to discharge fluid from the actuator. While the primary circuit is supplied by the high pressure pump, the pressure in the primary circuit is determined by the load imposed on the hitch, and at times may be less than the pressure in the secondary circuit.

Other features and the advantages of the invention will become apparent from the following description taken in connection with the accompanying drawing which schematically illustrates, by way of example, an embodiment of the invention.

In the drawing, reference numeral 10 designates the top control link of a typical three-point hitch which also includes a pair of lower draft links (not shown). Control link 10 is pivotally attached to a lever 11 having its lower end pivotally supported on the tractor chassis and its upper end pivotally connected with a rocker 12. The lower links of the three-point hitch are connected through drop links (not shown) with lift arms 14 (only one of which is shown) non-rotatably mounted on a rockshaft 16. Rotation of rockshaft 16 is controlled by an actuator 18 in the form of a hydraulic ram having a cylinder 19 and a piston 20. The rod 20a of piston 20 is pivotally connected with an arm 21 non-rotatably secured to the rockshaft. The admission of hydraulic fluid ton cylinder 19 tends to cause piston 20 to move toward the left as viewed in the drawing and cause lift arm 14 to raise the hitch linkage relative to the tractor. Conversely, the exhaust of hydraulic fluid from cylinder 19 tends to allow piston 20 to move toward the right as urged by the downward forces exerted by the implement, and lower the hitch linkage relative to the tractor.

Admission and exhaust of hydraulic fluid to the actuator 18 is controlled by a hydraulic control system indicated generally by reference numeral 22. Control system 22 includes a high pressure main pump 24, a low pressure charging pump 25, a relay mechanism 26 and a pilot valve 27. The main pump 24 in the illustrated embodiment is of the type disclosed in the Ferguson U.S. Patent 2,118,180 and includes a rectangular, hollow frame 28 in which is received a block 29 mounted on an eccentric 30 carried by the pump shaft 31. Rotation of shaft 31 and eccentric 30 causes block 29 to reciprocate within frame 28 and the motion of the eccentric causes frame 28 to reciprocate horizontally as viewed in the drawing. Pistons 32 carried by frame 28 are in turn caused to reciprocate within chambers 33 to create a pumping action. Pump 24 has its output connected with a high pressure line 34 in the primary circuit through an exhaust valve 35. The high pressure line 34 is connected with cylinder 19 to supply the actuator 18 with hydraulic fluid when delivered by main pump 24.

The hydraulic control system responds to movement of a control linkage, designated generally by reference numeral 36, as determined by changes in a controlled hitch linkage condition. The main pump 24 has its intake connected with a low pressure line 37 through an intake valve 38. Pump 24 is driven continuously, and when fluid is delivered to the intake of pump 24 through line 37, pump 24 delivers additional hydraulic fluid to actuator 18 through the high pressure line 34. When fluid is not available in line 37, the pump piston 32 will merely reciprocate within chamber 33 without pumping any fluid to line 34.

Line 37 is connected with a delivery port 40 in the housing of relay 26, and a supply line 41 is connected with a supply port 42 in the relay housing. Supply line 41 is connected with output line 44 of charging pump 25 through a priority valve 43. The charging pump 25 has its intake line 45 connected with a sump or reservoir through a filter screen (not shown) and is continuously driven to pump fluid from the reservoir into line 44 which in turn is connected with hydraulic control elements shown schematically at 46 and 48 for operating the clutch, brakes and transmission, etc., of the tractor. Priority valve 43 serves to maintain a minimum pressure in line 44 for operating control elements 46 and 48. Excessive pressure in lines 41 and 44 is prevented by a relief valve 49 which controls communication between line 41 and an exhaust line 50 connected with sump.

Supply line 41 is connected through a restriction 51 with a control line 53 which in turn communicates with a control port 54 in the relay housing as well as with pilot valve 27. Control line 53 is provided with a restriction 55, which may be adjustable, between control port 54 and pilot valve 27. Pilot valve 27 includes a valve element 56 which, in the illustrated embodiment, is in the form of a ball movable relative to a valve port 57 to control communication between control line 53 and an exhaust line 58 connected with the reservoir. The position of valve element 56 relative to port 57 is determined by a downward force exerted on valve element 56 by an operating member in the form of a rod 60. Thus, when rod 60 forces valve 56 downwardly toward port 57, the flow from control line 53 to the reservoir through line 58 is shut off as the valve 56 seats or further restricts the escape of fluid at port 57. On the other hand, flow from control line 53 to the reservoir through line 58 increases as valve element 56 is permitted to move away from port 57 by the operating rod 60. Consequently, as the downward force on rod 60 increases, the pressure in control line 53 increases.

The relay housing is formed with an annular port 62 connected with a branch 61 in the primary circuit from the high pressure line 34, and a branch 63 from line 34 is connected with a restricted port 64 in the housing of a flow control valve 65. The flow control valve 65 includes a cylindrical valve element 67 which controls an exhaust port 68 and is subjected on one side to the pressure in line 34 through port 64, and on the other side to the pressure from a line 72 communicating with a port 73 in the relay housing. The stem 69 of the valve element 67 is formed with an apertured spring seat 70 for a spring 71 which biases valve 67 to the right in a direction tending to open exhaust port 68.

Slideably received in the relay housing is a servo piston element 75, a charging valve element 76, and a discharge valve element 77. The discharge valve 77 is in the form of a hollow cylindrical member formed with an external circumferential groove 78 and a pair of diametrically opposed charging ports 79. The charging valve element 76 controls the charging ports 79 and is formed with a snap ring 80 to form an abutment limiting the travel of valve 76 toward the right relative to valve 77. The servo piston 75 is subjected to the control pressure from line 53 through port 54 on one side, and to the pressure at a port 81 on the other side. Port 81 is open to atmosphere permitting breathing as piston 75 moves. Pressure at the actuator acts through port 64 to urge valve 67 closed until the pressure in line 72 admitted by the relay equalizes or balances the pressure from port 64, whereupon spring 71 moves valve 67 to the right, opening port 68. Flow starts when the discharge valve connects annulus 62 with port 73. Fluid escapes to sump through line 72 and port 68. However, flow through valve 77 at annulus 62 is at a relatively low pressure as determined by the force of spring 71. The volume of flow is determined by the extent of opening established at the annulus, and the speed of lowering is thus substantially independent of the force imposed on the actuator.

In the position of elements 75, 76 and 77 illustrated in the drawing, port 62 is closed by the discharge valve 77, and the charging ports 79 are closed by the charging valve 76. Movement of valve 77 toward the right end wall 82 of the relay housing will bring port 62 into communication with exhaust port 73 through the circumferential groove 78. As a consequence, fluid will flow from branch 61 through groove 78 and line 72 into the flow control valve 65, and the pressure exerted on the side of valve element 67 opposite port 64, together with the force of spring 71, will force valve element 67 toward the right to connect line 72 with the exhaust port 68 and discharge hydraulic fluid from actuator 18. Conversely, movement of the charging valve 76 toward the left will uncover the charging port 79 and permit fluid to flow from supply line 41 through valve 77 and ports 79 and 40 to the intake line 37 of the main pump 24. Pump 24 will then deliver additional hydraulic fluid to actuator 18 through line 34 which will cause piston 20 to raise lift arms 14 and the hitch linkage.

Valve elements 76 and 77 are actuated by the servo piston 75 in accordance with pressure changes in control line 53. If the pressure in line 53 drops, the pressure in supply line 41 will tend to shift valve 76 and piston 75 toward the left end wall 83 of the relay housing and connect the supply line 41 with the intake line 37 of the pump causing more hydraulic fluid to be supplied by pump 24 to the actuator. An increase in the pressure of line 53 will tend to cause piston 75 to move toward the right to sequentially close charging ports 79 and shift discharge valve 77 toward the right end wall 82 of the relay housing and connect port 62 with exhaust port 73 to initiate discharge of hydraulic fluid from the actuator 18 through valve 65. A transverse groove 77b is formed in the right end of valve 77 to assure that valve 77 will be subjected to the pressure from line 41 in its extreme right position against end wall 82.

In the position illustrated, the pressure in control line 53 acting on servo piston 75 is sufficient to balance the pressure from supply line 41 acting on the combined areas of valve elements 76 and 77 if the discharge valve is ready to open; and flow of hydraulic fluid to or from actuator 18 is prevented. However, the force required to hold valve 76 closed is considerably less than that required to balance both valves. The pressure exerted through line 41 against the exposed area of valve 77 is resisted by a snap ring 77a. This force will be transferred from snap ring 77a to snap ring 80 when the pressure on piston 75 balances the combined areas of valves 76 and 77 prior to opening of discharge valve 77. Thus, the supply position or condition of relay 26 is that condition in which ports 79 are uncovered by charging valve 76 to admit fluid from supply line 41 to the intake line 37 of the high pressure pump 24 to thereby cause fluid to be delivered to the actuator; the neutral position of the relay is that position shown in the drawing in which there is no communication between supply line 41 and intake line 37, nor between port 62 and exhaust port 73, and fluid is trapped in the actuator; and the discharge position of the relay is that position in which communication is shut off between ports 42 and 79 and in which port 62 communicates with exhaust port 73 through groove 78.

When the operating member 60 forces pilot valve element 56 to its fully closed position against port 57 to completely shut off communication between line 53 and exhaust line 58, the control pressure acting on piston 75 will increase to the output pressure of pump 25 if valve element 56 remains seated against port 57. When the pilot valve element 56 is fully opened to permit full communication between port 57 and exhaust line 58, the control pressure on piston 75 will drop to substantially zero if the valve element 56 remains opened. The pressure from supply line 41 acts against the combined cross-sectional areas of charging valve 76 and discharge valve 77. The supply pressure in line 41 is substantially equal to the output pressure of charging pump 25 having a maximum limit determined by relief valve 49. Thus, with pilot valve element 56 fully closed, the pressure in line 53 gradually approaches the supply pressure in line 41 due to its connection with supply line 41 through restriction 51. When the pressure in control line 53 acting on piston 75 results in a force toward the right end wall 82 greater than the force determined by the supply pressure from line 41 acting on the charging valve 76 and discharge valve 77, piston 75 will force valves 76 and 77 toward end wall 82 to connect port 62 with ports 73 through the circumferential groove 78. If the pressure then drops in control line 53 until the force determined by the supply pressure acting on valves 76 and 77 is greater than the force of the control pressure acting on piston 75, the valve elements 76 and 77 as well as piston 75 will move toward the left to first assume the position shown in the drawing until the snap ring 77a engages the shoulder 26a of the relay housing, and if the pressure continues to drop in control line 53, the force determined by the supply pressure acting on the cross-sectional area of charging valve 76 will continue to move charging valve 76 and piston 75 toward the left to uncover ports 79.

As a further specific example of the operation of relay 26, let it be assumed that the charging pump 25 is capable of delivering pressure into supply line 41 of 200 p.s.i, and that the cross-sectional areas of charging valve 76, discharge valve 77 and piston 75 are respectively .25 square inch, .50 square inch and 1.00 square inch determined by diameters of approximately .56 inch, .80 inch and 1.13 inches, respectively. Thus, with 200 p.s.i. pressure in supply line 41, a force of 50 pounds acts on charging valve 76 tending to move it toward the left, and a force of 50 pounds acts on discharge valve 77 tending to move it toward the left until snap ring 77a engages shoulder 26a. Thus, when the control pressure is less than 50 p.s.i., charging valve 76 will move toward the left to open ports 79 to permit intake line 37 to receive fluid from supply line 41. When the pressure in control line 53 is 50 p.s.i., valve 76 will close ports 79 and the system will be balanced as shown in the drawing with the elements in their neutral position. When the control pressure acting on piston 75 is 100 p.s.i. or greater, the valves move toward the right to bring groove 78 into communication with annular port 62 and discharge fluid from actuator 18 through line 72 and the flow control valve 65. The foregoing values are given by way of illustration only and are not to be construed in a limiting sense.

Rod 60 is slidable in pilot valve 27 and is biased upwardly by a spring 85 to permit the pilot valve element 56 to open. Mounted near the upper end of rod 60 is a tranverse bar 86. Pivotally mounted on rod 60 below bar 86 is a beam 87 engaged at one end by a pressure control rod 88 slidably mounted in a housing 90 formed with a pressure chamber 91. Chamber 91 communicates with branch 63 of the primary circuit. The pressure control rod 88 is biased upwardly by a spring 89, and is urged downwardly by the pressure in the chamber 91 acting on the upper end of a piston 94 slidable in chamber 91 and seated on a spring retainer 88a mounted on the upper end of rod 88. The opposite end of beam 87 is engaged by a rod 93 slideable in a fixed support 92 and having a collar 95 on its lower end engaging the underside of beam 87. Seated between the upper side of beam 87 and a spring support collar 97 secured to rod 93 is a spring 96 which surrounds rod 93 between beam 87 and collar 97. Thus, if rod 88 is forced downwardly by an increase in the pressure in chamber 91, beam 87 pivots about its engagement with rod 93 and carries control rod 60 downwardly in a direction to urge the pilot valve element 56 toward its closed position against port 57. Spring 96 preloads beam 87 against collar 95 and places rod 93 in tension since collar 97 is secured to rod 93 and since the upper end of spring 96 is seated against collar 97. When collar 97 is in engagement with the underside of the fixed support 92, spring 96 serves as a breakaway connection to prevent jamming or damage, should there be a sudden surge of pressure in chamber 91 tending to pivot beam 87 clockwise about the operating member 60.

Projecting over one end of bar 86 is a draft control lever 99 which is urged by a spring 100 in a direction to engage bar 86 and urge rod 60 downwardly. A position control lever 101 projects over bar 86 on the opposite side of control rod 60 from lever 99 and is urged by a spring 102 in a direction to engage bar 86 and push rod 60 downwardly.

The position of pilot valve element 56 is thereby determined by the element 87, 99 or 101 exerting the greater downward force on the pilot valve operating member 60. In other words, if either beam 87, draft control lever 99 or position control lever 101 pushes rod 60 downwardly to close valve element 56, the pressure acting on servo piston 75 will increase and tend to shift the relay elements toward the discharge position to drain hydraulic fluid from actuator 18.

The draft control lever 99 is pivotally mounted on one end of a pair of links 104, the others ends of which are pivoted at 104a about a fixed point on the tractor structure. A roller 105 at the pivotal connection between lever 99 and links 104 is engaged by a draft control cam 106 depending from a shaft 107. Cam 106 is interconnected with a link 109 by a pin 110, link 109 also being mounted on shaft 107. Shaft 107 is supported at one end on an arm 111 mounted on a shaft 112 fixed to the tractor. The other end of shaft 107 is secured to a position control cam 113 also carried by shaft 112. Mounted on cam 113 is a cam follower roller 114 which is engaged with a spiral cam 116 non-rotatably mounted on rockshaft 16.

Draft control lever 99 is fulcrumed between link 104 and spring 100 on a roller 117 carried by an arm extending from a shaft 118. Fixed to the opposite end of shaft 118 is a draft control handle or quadrant lever 119. By rotating handle 119, the fulcrum roller 117 moves upwardly or downwardly to raise or lower lever 99.

Link 109 is pivotally connected with one end of a draft sensing rod 120, the other end of which is slidably received in an end wall of a housing 121 for spring assembly. Supported within housing 121 is a plunger 122, one end of which is threadedly secured to a tubular portion 123a of a yoke 123 pivoted to rocker 12. The yoke portion 123 is slideably supported in an adjustable sleeve member 124 threaded into the end wall of housing 121 such that movement of rocker 12 about its pivot 12a causes plunger 122 to reciprocate within the housing. The end 125 of plunger 122 opposite yoke 123 is slideably received in a retaining cup 126 which in turn is slideably mounted in housing 121. Seated between the retaining cup 126 and the sleeve member 124 and portion 123a of yoke 123 is a heavy double acting spring 127. The general construction and arrangement of the spring assembly 128 is disclosed in Chambers and Bunting, U.S. Patent 2,437,875, of Mar. 16, 1948, and Bunting Patent 2,996,124 of Aug. 15, 1961.

Compression in the top control link 10 tends to cause rocker 12 to swing counterclockwise about its pivot 12a and move plunger 122 toward the right to compress spring 127 against cup 126. Tension in control link 10 tends to cause rocker 12 to swing clockwise about its pivot 12a, moving plunger 122 and cup 126 toward the left in the drawing and compress spring 127 against sleeve 124.

Movement of plunger 122 toward the right sufficiently for end 125 to engage the sensing rod 120 causes rod 120 to rotate cam 106 in a counterclockwise direction about shaft 107, or toward the right as viewed in the drawing, and depress roller 105. Depression or roller 105 pivots lever 99 in a counterclockwise direction about the fulcrum roller 117 thereby tending to open pilot valve element 56 to call for more hydraulic fluid for actuator 18.

The position control lever 101 is pivotally connected with one end of a pair of links 129 similar to links 104, and a roller 130 is carried at the pivotal connection between links 129 and lever 101 which is engaged by the position control cam 113. A fulcrum roller 131 is carried by an arm mounted on a sleeve or hollow shaft 132 rotatably mounted on shaft 118. A position and pressure control quadrant lever or handle 133 is fixed to the end of shaft 132 for changing the position of fulcrum 131 to raise and lower lever 101 relative to bar 86. Shaft 132 also has an arm carrying a pin 134 engageable with the upper end of rod 93.

The position and pressure control handle 133 moves through both a "position" range and "pressure" range. The position range is defined between the points indicated at A and B on the drawing, and the pressure range is defined between points B and C. As handle 133 moves from point B toward point A in the position range, the fulcrum roller 131 moves downwardly, and spring 102 in turn causes lever 101 to move downwardly and exert more downward force on control rod 60 thereby tending to discharge hydraulic fluid from actuator 18 and lower the tractor hitch linkage. When handle 133 is in position B, fulcrum 131 is at its highest point and lever 101 is substantially out of contact with bar 86 thereby tending to permit valve element 56 to open and initiate delivery of additional hydraulic fluid to actuator 18 and raise the hitch linkage. Lever 101 is out of contact with bar 86 only until cam 116 has diminished its edge height, as in rotating to transport position, again permitting spring 102 to exert sufficient downward force on 86 and 60 to produce restriction at valve 56 and thus puild up enough hydraulic pressure behind piston 75 to close intake ports 79. Thus, point A is the "down" position of the hitch linkage when in position control, and point B designates the "up" or "transport" position of the hitch linkage when in position control. As the handle 133 moves from point B toward point C, pin 134 comes into contact with rod 93 and pushes downwardly on the rod thereby requiring less pressure in chamber 91 to close valve element 56 to actuate relay 26 to its discharge position to lower the hitch linkage. As rod 93 is moved downwardly by pin 134, less pressure is required in chamber 91 to close the pilot valve element 56 and discharge hydraulic fluid from actuator 18. As handle 133 moves into the position range from position B toward position A, pin 134 moves out of contact with rod 93. In the event that high pressure in chamber 91 forces the pressure control rod 88 downwardly when handle 133 is in the position range, collar 97 will be stopped by support plate 92. The engagement of collar 97 with plate 92 determines the maximum pressure in the primary circuit (lines 34, 61, 63) in either draft or position control. When control handle 133 is in the pressure range, the maximum pressure in the primary circuit is reduced progressively as handle 133 moves toward point C.

When the draft control handle 119 is in position indicated at D, the fulcrum roller 117 is at its highest position to raise lever 99 relative to bar 86 against the force of spring 100. The draft control lever 99 thus exerts a minimum downward force on control rod 60 when control handle 119 is in position D, and this position of control handle 119 tends to cause the actuator 18 to raise the hitch linkage. As control handle 119 moves downwardly toward position E, the fulcrum roller 117 moves downwardly permitting the draft control lever 99 to exert a progressively greater force on the control rod which tends to initiate discharge of hydraulic fluid from actuator 18 to lower the hitch linkage.

If a plow or similar earthworking implement is supported on the hitch linkage, the draft force developed by the implement tends to place the control link 10 in compression and move it toward the right and compress spring 127. For draft control operation, control handle 133 is placed in position B, and the draft control handle 119 is moved to an intermediate position between points D and E determined by the desired working depth of the implement. As handle 119 moves downwardly toward position E, roller 117 moves downwardly and lever 99 exerts a downward force on control rod 60 tending to close valve element 56 and the hitch link lowers the implement into the ground. As lift arm 14 rotates downwardly, cam 116 acts through follower 114 and cam 113 to pivot shaft 107 and arm 111 downwardly about shaft 112 which movement pushes down on roller 105 and pivots draft lever 99 in a counterclockwise direction about roller 117 to relieve the closing force on valve element 56 until valve element 56 reaches a neutral position to balance the hydraulic system. The draft force developed by the implement tends to place control link 10 in compression and move plunger 122 toward the right against draft spring 127. If the draft force increases sufficiently to move link 120 toward the right, cam 106 will cause roller 105 to move downwardly to pivot draft lever 99 away from bar 86 to move the pilot valve element 56 toward its open position and initiate delivery of additional fluid to actuator 18 and raise the hitch. As the hitch begins to rise, the resulting rotation of rockshaft 16 and cam 116 causes a follow up movement through a cam 113 resulting in the draft cam 106 moving in a clockwise direction about shaft 107 to permit lever 99 to pivot clockwise about roller 117, to gradually move valve element 56 toward its neutral position and stop the flow of fluid to actuator 18. The feed back imparted by cam 116 tends to squelch the linkage movement that would otherwise result from a given change in the controlling force on link 10. Cam 116 automatically provides the equivalent of manually shifting the control handle 119 to maintain depth and compensate for a change in soil resistance.

As the draft control quadrant lever or handle 119 moves toward position D, lever 99 will be raised, thereby relieving the load of spring 100 from bar 86. The biasing force of spring 100 acts through lever 99 on cam 106 to urge rod 120 against end portion 125 of plunger 122. A stop 120a is provided on rod 120 which engages the end wall of housing 121 and prevents overtravel of rod 120 when control link 10 is in tension.

When operating in position control, the draft control handle 119 is moved to position D and the position control handle 133 is moved to any desired position between points A and B. As the handle moves toward position A, lever 101 pivots in a clockwise direction about roller 130 to push downwardly on control rod 60 and close the valve element 56 to actuate the relay to its discharge position. The resulting downward movement of lift arm 14 and rotation of rockshaft 16 causes cam 116 to rotate cam 113 in a counterclockwise direction about shaft 112 to provide a follow up counterclockwise rotation of lever 101 about roller 131 until the system is balanced when the hitch linkage is in the position determined by the position of quadrant lever 133 between points A and B.

When control handle 119 is in the "up" position as indicated at D, and control handle 133 is between points B and C, valve element 56 is under the control of rods 93 and 88. When the pressure in chamber 91 is sufficient to pivot beam 87 downwardly about rod 93, the relay will be actuated to its discharge position and fluid will be drained from actuator 18. The pressure required in chamber 91 to actuate the pilot valve element 56 toward its closed position decreases as control handle 133 moves toward position C. As pointed out previously, the pilot valve is under the control of the lower of elements 93, 99 or 101 since it is the closing force on valve element 56 that determines the pressure acting on servo piston 75.

Spring 96 on rod 93 serves as a breakaway spring to prevent damage upon sudden surges of pressure in chamber 91 such as might occur when the tractor carries a heavy implement over rough terrain. The damping restriction 55 controls the rate of response of the piston 75 to movement of valve element 56. If valve 56 is suddenly opened, the pressure in control line 53 will reduce gradually due to restriction 55. Restriction 51 maintains a sufficient pressure drop between supply line 41 and control line 53 such that the pressure in supply line 41 is unaffected by the pilot valve.

The high pressure pump 24 is continuously driven by the tractor engine, and a gear 150 fixed to the shaft 31 of pump 24 engages the gear 151 on the shaft of the charging pump 25 to continuously drive the charging pump.

Reference numeral 135 designates an auxiliary pump having its intake connected through a line 136 through a filter screen not shown with a reservoir and its output connected through a line 137 with a manual auxiliary valve 138. Valve 138 controls an auxiliary double acting cylinder 140 having a piston 143. When the handle 139 of valve 138 is in its neutral position, line 137 is in communication with the line 144 and pump 135 continuously pumps fluid through lines 137 and 144 to a cooler 145 where the fluid passes from the cooler through a filter back into the reservoir. Valve 138 can be actuated by handle 139 to connect line 137 with either lines 141 and 142 which communicate with the cylinder 140 on opposite sides of piston 143. When the output line 137 is connected with line 142, piston 143 is extended from the cylinder and line 141 is connected with line 144 to permit fluid to be drained from the upper side of the cylinder as viewed in the drawing back into sump. Conversely, to retract piston 143 into cylinder 140, handle 139 is moved to a position to connect line 141 with line 137 and line 142 with line 144. Excessive pressure in line 137 is prevented by a relief valve 146 connected with sump.

A low pressure relief valve 150 connected into line 144 serves as a bypass valve to prevent excessive back pressure from ever developing in a discharge condition of the auxiliary valve. Valve 150 also limits the pressure that can be developed at the cooler or filter due either to plugging or restricting during cold weather. Valve 150 thus protects both the cooler and the filter.

The auxiliary pump 135 has a gear 152 on its shaft engaged with gear 150 so that all three pumps are simultaneously driven by the engine and with both charging pump 25 and auxiliary pump 135 being driven off the shaft of the main pump 24. The continued circulation of the fluid through cooler 145 by auxiliary pump 135 when valve 138 is not in use provides continuous cooling of the hydraulic fluid.

While a specific embodiment including the various features of the invention have been illustrated and described, it should be understood that the invention is not limited to the exact construction shown but that other forms will be apparent to those skilled in the art, all of which fall within the scope and spirit of the invention.

I claim:

1. In a tractor having a hydraulic actuator for controlling an implement hitch linkage mounted on the tractor such that the delivery of hydraulic fluid to the actuator tends to raise the hitch linkage and the exhaust of hydraulic fluid from the actuator tends to lower the hitch linkage, hydraulic control means for controlling the delivery and exhaust of hydraulic fluid to and from the actuator, characterized in that said hydraulic control means include: a reservoir containing hydraulic fluid, a primary hydraulic circuit connected with the actuator, a pump for supplying hydraulic fluid to the primary circuit, a secondary hydraulic circuit, means for delivering fluid from the reservoir to the secondary circuit, means for supplying hydraulic fluid from the secondary circuit to the pump including a relay responsive to pressure changes in the secondary circuit to control the supply of hydraulic fluid to the pump from the secondary circuit, and hitch condition responsive means for varying the pressure in the secondary circuit in response to changes in a controlled hitch linkage condition.

2. The construction claimed in claim 1 wherein said relay includes valve means operable in supply, discharge, and neutral conditions to respectively effect supply of hydraulic fluid to the pump for delivery to the actuator, effect exhaust of hydraulic fluid from the actuator, and block flow of hydraulic fluid to and from the actuator, and a servo element operable in response to pressure variations in the secondary circuit to operate the valve means between said supply, discharge and neutral conditions.

3. The construction claimed in claim 2 wherein said hitch condition responsive means comprises a pilot valve for controlling the pressure on the servo element.

4. The construction claimed in claim 3 wherein said servo element is received in a relay control chamber connected with the source, the pilot valve is located between the control chamber and exhaust, and said pilot valve controls communication between said control chamber and exhaust to vary the control chamber pressure.

5. The construction claimed in claim 4 wherein said pilot valve includes a valve element movable toward open and closed positions relative to said port to respectively decrease and increase the control chamber pressure.

6. The construction claimed in claim 5 wherein the hitch condition responsive means include a linkage system having a first member movable in response to changes in a first hitch linkage condition, a second member movable in response to changes in a second hitch linkage condition, and an operating member movable to actuate the pilot valve element between its open and closed positions, said operating member being engageable by said first and second movable members to actuate the pilot valve element in one direction, and said operating member being under the control of the one of said movable members tending to move it further in said one direction.

7. The construction claimed in claim 5 further including an operating member engageable with said pilot valve element to move said pilot valve element toward its closed position against the pressure in said control chamber, means biasing said operating member in a direction to permit the pilot valve element to move toward its open position, and a control linkage operable in response to changes in a controlled hitch linkage condition to move said operating member in a direction to close the pilot valve element.

8. The construction claimed in claim 7 wherein said control linkage includes a first member movable in response to changes in a first hitch linkage condition, a second member movable in response to changes in a second hitch linkage condition, and a third member movable in response to changes in a third hitch linkage condition, said operating member being movable by each of said movable members in a direction to actuate the pilot valve element toward its closed position and being under the control of only the movable member tending to move it further in the pilot valve element closing direction.

9. The construction claimed in claim 8 further including means for selectively placing the operating member under the control of one only of said movable members.

References Cited

UNITED STATES PATENTS 2,750,862    6/1956    Garmager            172—7
3,142,342    7/1964    Brudnak et al.       172—9

ROBERT E. PULFREY, Primary Examiner

J. W. PETERSON, Assistant Examiner

U.S. Cl. X.R.

137—488